INVENTORS
WILLIAM H. SMITH AND
DONALD E. DAILEY
BY
ATTORNEY

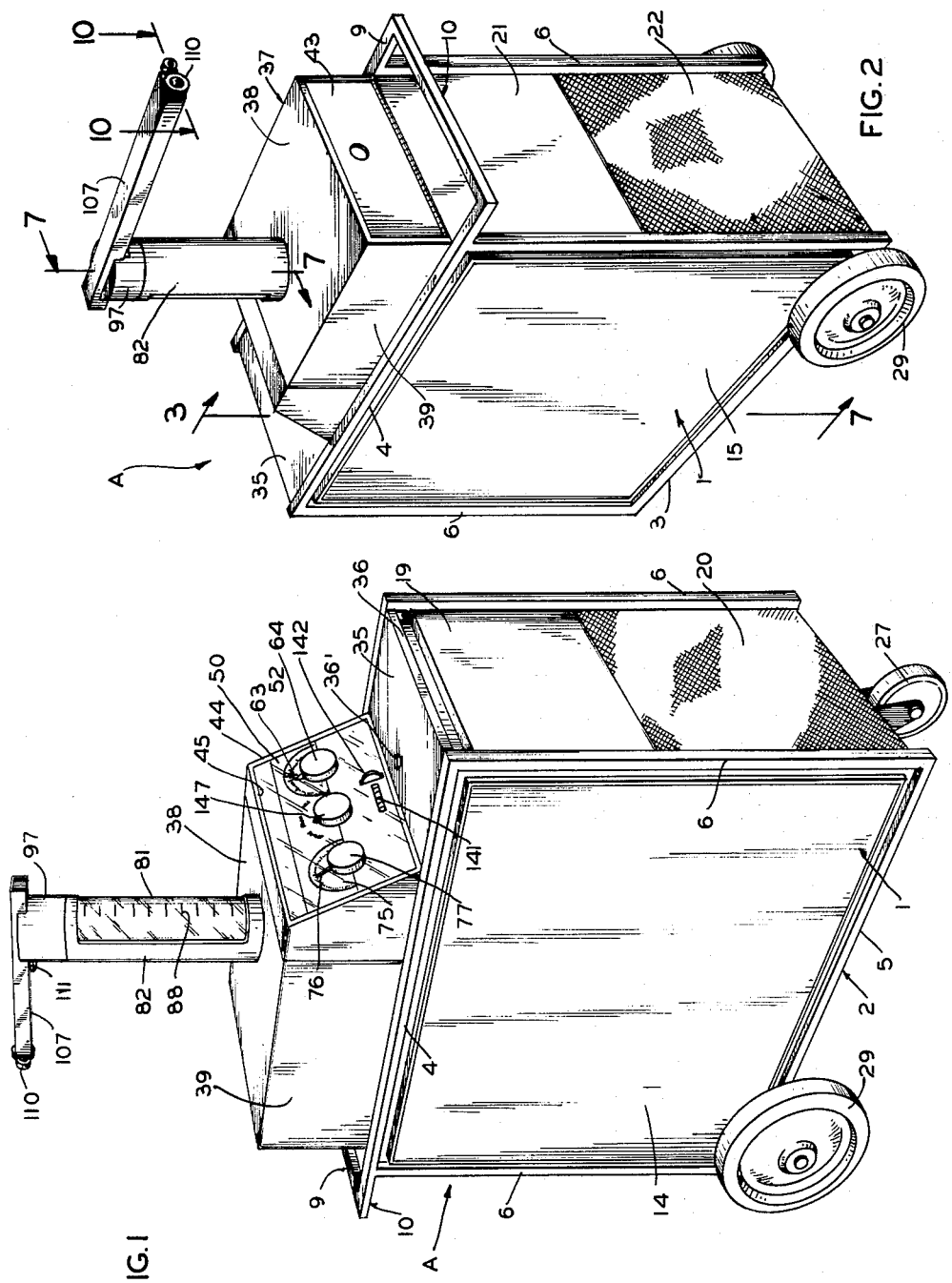

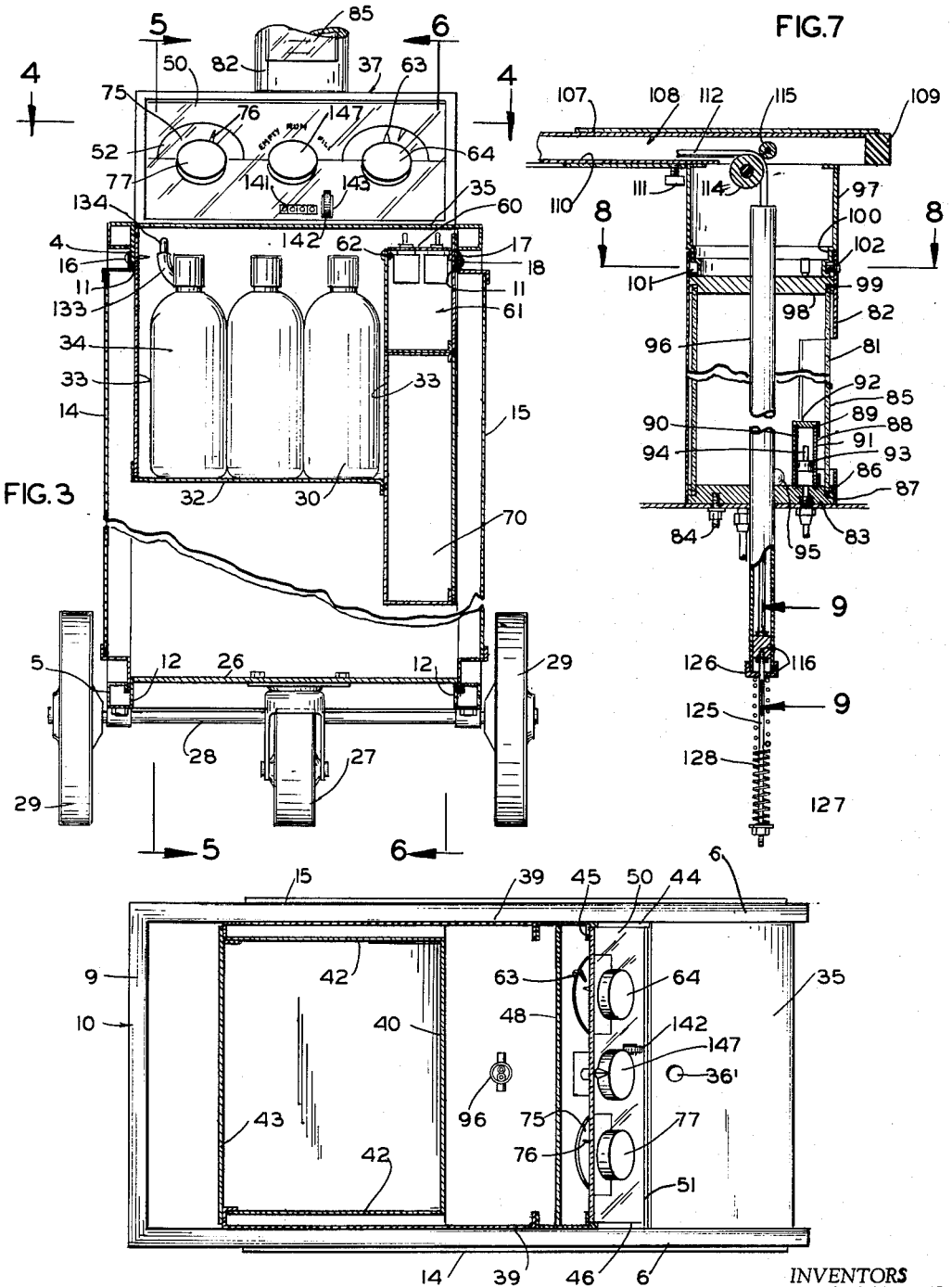

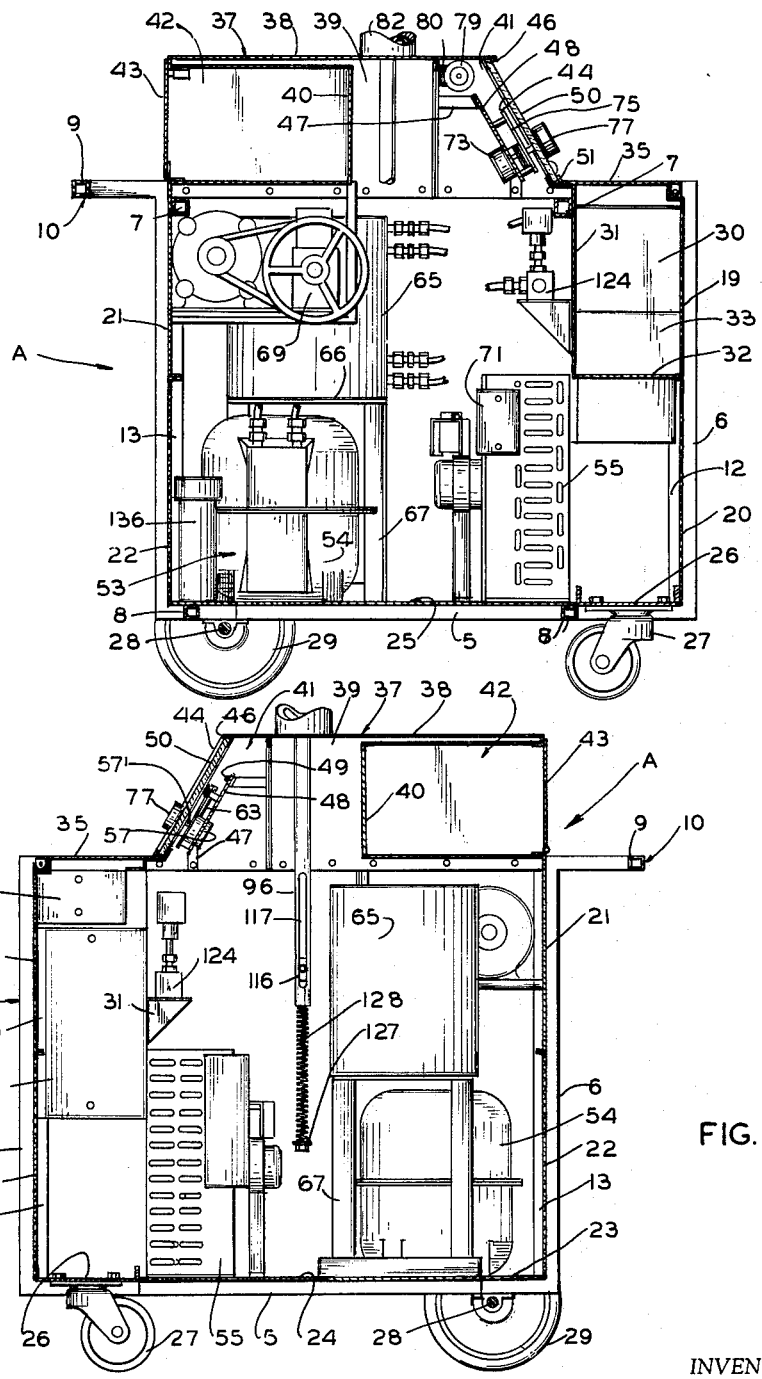

United States Patent Office 3,254,652
Patented June 7, 1966

3,254,652
MEANS AND METHODS FOR PRODUCING GASTRIC HYPOTHERMIA
William H. Smith, Rahway, N.J., and Donald E. Dailey, Evansville, Ind., assignors to Affiliated Hospital Products, Inc., a corporation of Delaware
Filed Mar. 15, 1963, Ser. No. 265,482
13 Claims. (Cl. 128—401)

This invention relates in general to certain new and useful improvements in a device and the method for producing gastric hypothermia, and, more particularly, to a device and method for treating and controlling gastrointestinal disorders, such as peptic uclers, gastrointestinal hemorrhage and the like.

The recent medical studies have shown that the use of intragastric cooling and intragastric freezing, often termed gastric hypothermia, has been very effective in the treatment of a large variety of gastrointestinal disorders, such as peptic ulcerations, gastrointestinal bleeding, and esophageal varices. It has been found that by cooling the stomach wall it is possible to control gastric digestion, the blood flow around the intestinal tract, and many gastric secretory responses. Medical tests have shown that by reducing the temperature of the stomach walls, the activity of the acid-producing cells is greatly decreased, and in general the stomach chemistry is retarded. In so doing, it has been possible, for example, to effectively control hemorrhaging such as in bleeding ulcers.

It has also been found that through the use of gastro hypothermia, it is possible to reduce the gastric secretion and digestion as much as by 80% to 90%. Moreover, the accumulation of pepsinogen granules and their release from the chief cells of the stomach mucosa have been greatly depressed through gastric hypothermia. Furthermore, by reducing the stomach temperature to approximately 10–14° C., the blood flow in the stomach wall has been reduced by as much as 70%. A greater percent reduction of blood flow can be achieved by still reducing the temperature less than the specified amount. Blood flow in the stomach walls is also reduced by the vascoconstriction of the blood vessel which is also due to the sub-normal temperature of the stomach wall. All of these findings have contributed greatly to the treatment of the various aforementioned stomach and gastro intestinal disorders.

Gastric freezing, as distinguished from gastric cooling, has been particularly effective in definitive control of peptic ulcer diathesis, such as in the control of massive upper gastro-intestinal hemorrhage. This method also has been particularly useful in instances of hemorrhage from duodenal ulcer, marginal ulcer, gastric ulcer, and many esophageal varices. Intragastic freezing has been found to be so effective that it completely eliminates hemorrhaging from bleeding ulcerations, and, moreover, various studies have shown that secretion of free hydrochloric acid is markedly reduced and, in fact, the stomach is often rendered anchlorhydric. Pepsin activities have been greatly reduced by intragastric freezing. The results on the patients by use of intragastric freezing and intragastric cooling have been excellent to date. The patients experience almost immediate relief of ulceration pain, through intragastric cooling and freezing. The healing of ulcer craters has been observed regularly by repeated upper gastrointestinal treatments. Moreover, the gastric hypothermia procedures have been found to be very effective in stopping hemorrhaging.

It is, therefore, the primary object of the present invention to provide a device and a method for producing gastric cooling and intragastric freezing.

It is another object of the present invention to provide a device and method for cooling and freezing various selected portions of the gastrointestinal tract for greatly reducing gastric activity in that portion of the tract.

It is a further object of the present invention to provide a device and method of the type stated for supportive therapy in the treatment of various gastrointestinal hemorrhages.

It is also an object of the present invention to provide a device of the type stated which is capable of producing and maintaining a constant pre-selected temperature in the gastrointestinal tract of the patient.

It is still another object of the present invention to provide a device of the type stated which includes a unique air monitoring system for insuring proper, safe and uninterrupted operation of the device.

It is another salient object of the present invention to provide a device of the type stated which is capable of achieving a rapid and high rate of cooling in an efficient manner and which is capable of extended operation without costly or repeated maintenance.

With the above and other objects in view, our invention resides in the novel features of form, construction, arrangement, and combination of parts presently described and pointed out in the claims.

In the accompanying drawings

FIG. 1 is a front perspective view of a gastric cooling device constructed in accordance with and embodying the present invention;

FIG. 2 is a rear perspective view of a gastric cooling device constructed in accordance with and embodying the present invention;

FIG. 3 is a vertical fragmentary sectional view taken along line 3—3 of FIG. 2;

Figure 8:
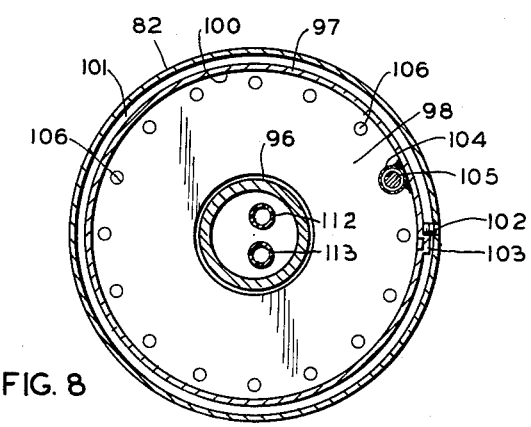
Figure 9:
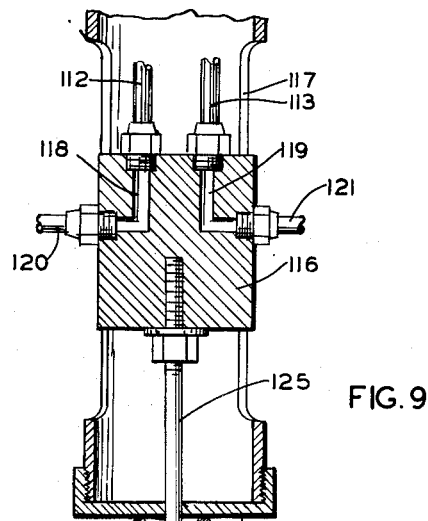
Figure 10:
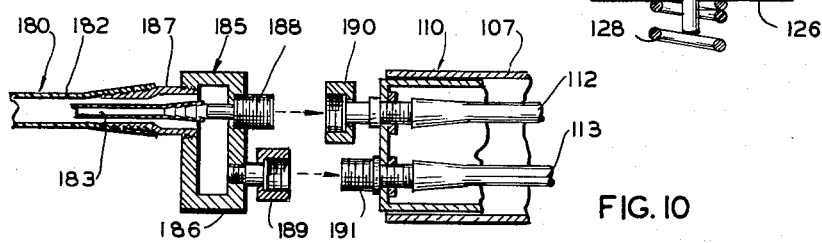
Figure 11:
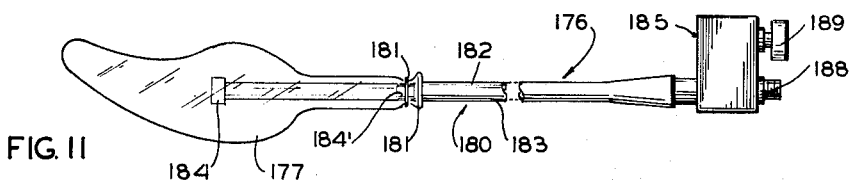
Figure 12:
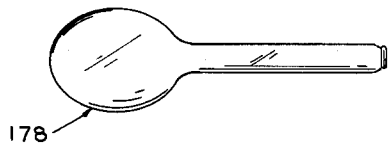
Figure 13:
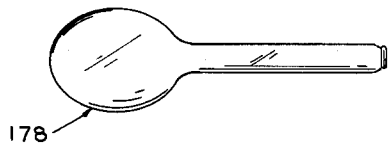
Figure 14:
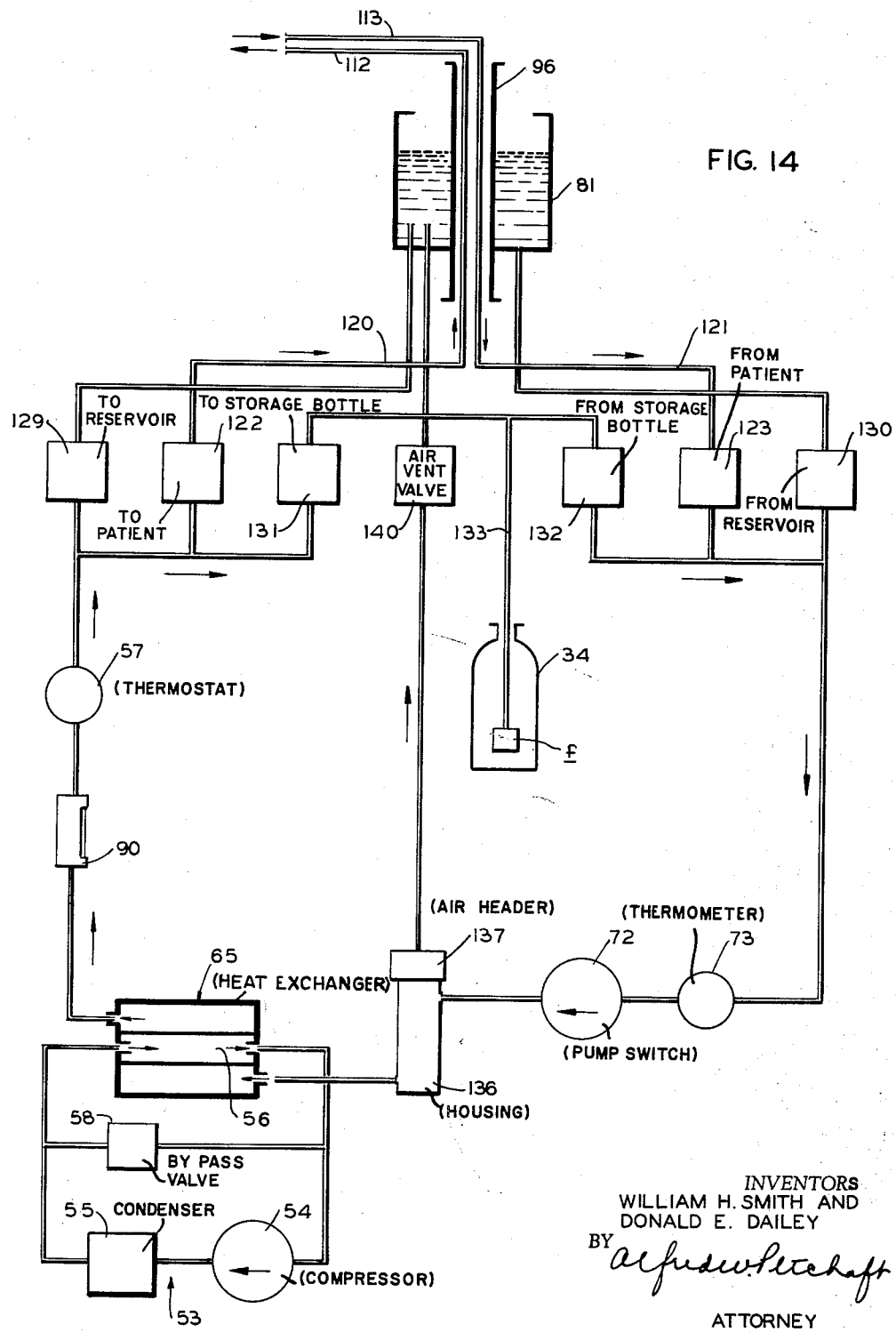
Figure 15:
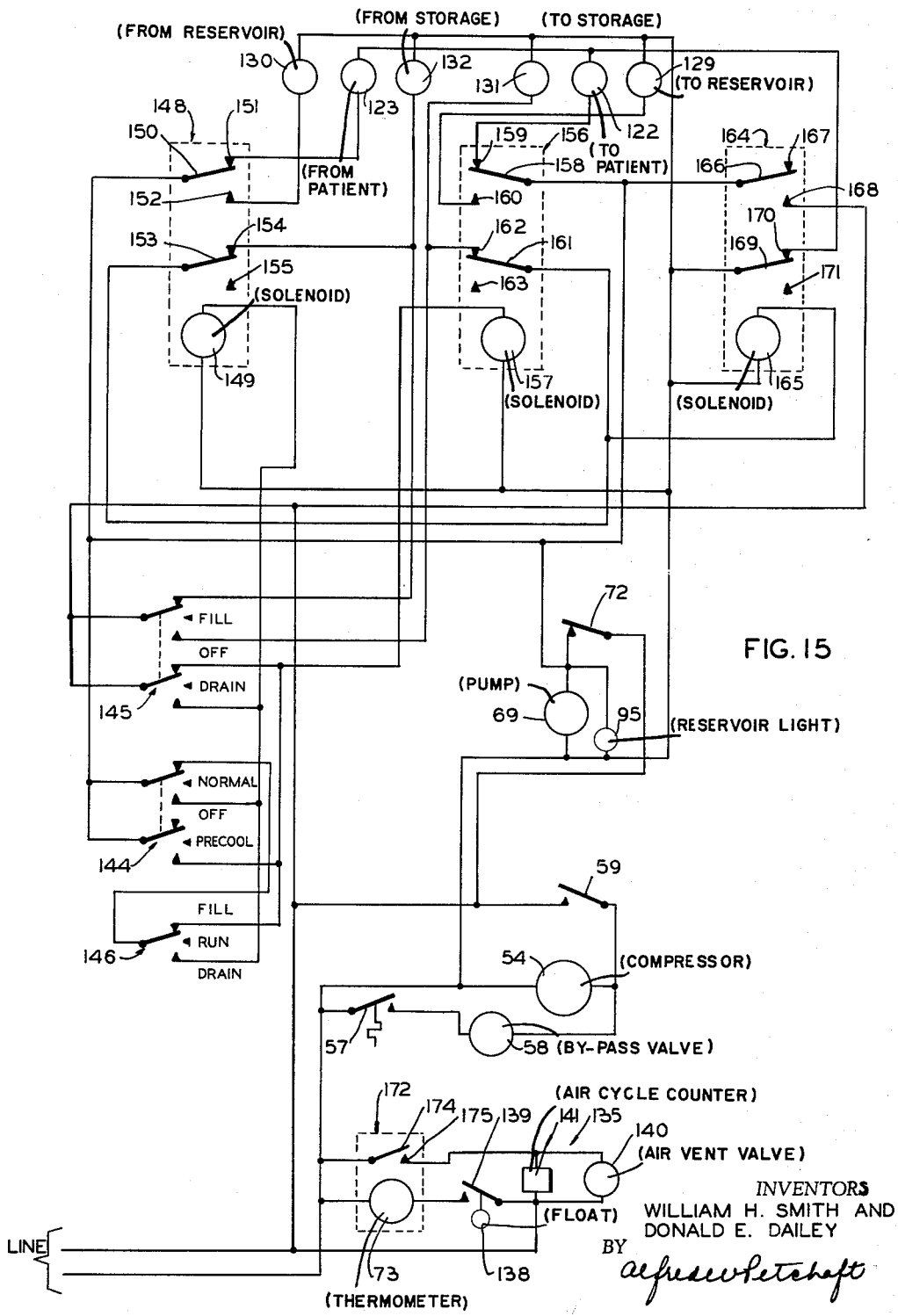

FIGS. 4, 5, and 6 are fragmentary sectional views taken along lines 4—4, 5—5, and 6—6, respectively, of FIG. 3;

FIG. 7 is a fragmentary sectional view taken along line 7—7 of FIG. 2;

FIGS. 8 and 9 are fragmentary sectional views taken along lines 8—8 and 9—9, respectively, of FIG. 7;

FIG. 10 is a fragmentary sectional view taken along line 10—10 of FIG. 2;

FIG. 11 is a side elevational view of a balloon assembly forming part of the present invention;

FIG. 12 is a side elevational view of a gastric balloon used in the balloon assembly of FIG. 11;

FIG. 13 is a side elevational view of an esophageal balloon used in the balloon assembly of FIG. 11;

FIG. 14 is a schematic view of the hydraulic circuitry forming part of the present invention; and FIG. 15 is a schematic view of the electrical circuitry forming part of the present invention.

Generally speaking, the present invention consists of a method and a device for producing gastric hypothermia which includes both gastric cooling and gastric freezing. In gastric cooling, the temperature of the stomach wall is lowered to a range of 10° C. to 14° C., in order to retard stomach chemistry and blood flow. Clinical studies have shown that the gastric cooling is particularly effective in controlling the hemorrhaging and for supportive therapy. In gastric freezing the temperature of the stomach wall is lowered to a range of —7° C. to —10° C. This type of hypothermia has been shown to be effective in the treatment of many duodenal and peptic ulcers.

In inducing gastric hypothermia, the patient is normally given a sedative and a nasogastric tube is inserted in the stomach in order to lavage the stomach of all blood and clots. Finally, the tube is left in place and connected to a source of suction in order to remove any further blood or clotted material which may occur. Next, a radio-opaque flexible sac or so-called "balloon,"

together with liquid circulation tubing, is inserted through the nose of the patient and down into the stomach. The cooling liquid is then pumped into the balloon where the balloon will expand to fill the entire volume of the stomach and remain in interfacial contact with the interior wall of the stomach. The cooling fluid is continually recirculated to the device in order to maintain a constant temperature and means is employed to insure that any air which may have been introduced into the system is purged therefrom.

The apparatus of the present invention generally consists of an outer housing which contains a refrigeration unit and heat-exchanger for cooling the liquid which is pumped into the gastric balloon. A pump is provided for continually pumping in the liquid under pressure into the balloon and back through the heat-exchanger for maintaining a constant temperature. The temperature of the circulating fluid is controlled by a thermostat which is maintained in a control panel forming part of the device. The refrigeration unit also includes a special bypass for precooling. Thus, it is possible to precool the cooling liquid prior to use. A thermometer is also provided for determining the temperature in which the cooling fluid is returned from the patient.

The device of the present invention alos includes an air monitor system to purge the closed cooling system of air which may accidentally leak into the system during operation. Furthermore, the air monitor system is provided with a counter for indicating the number of times the purging operation has been performed so that the surgeon or attending nurse can definitively note the degree and extent of air leakage at all times during operation of the device.

Finally, the device of the present invention is provided with a reservoir which contains the cooling liquid. The reservoir is provided with a sight glass and thereby provides the gastro-enterologist a convenient means for determining the amount of cooling fluid which was admitted to the balloon. Moreover, the reservoir is operatively connected to the air monitor system so that any air which is introduced into the closed cooling system bubbles through the reservoir and can be physically observed by the gastro-enterologist.

Refering now in more detail and by reference characters to the drawings which illustrate a preferred embodiment of the present invention, A designates a gastric hypothermia device including an outer housing 1 which consists of a pair of spaced parallel opposed rectilinear side frames 2, 3, each having upper and lower support rails 4, 5, connected at their forward and rearward ends by uprights 6. The uprights 6 of each of the side frames 2, 3, are connected along their upper and lower margins by upper and lower front and rear cross-bars 7, 8. The upper horizontal support rails 4, of each of the side frames 2, 3, extend rearwardly beyond the rear uprights 6 and are connected by a bight 9 forming a handle 10.

The upper and lower rails 4, 5, of each of the side frames 2, 3, are preferably rectangular in cross-section, and are provided on their interior face with downwardly and upwardly extending flanges 11, 12, respectively. The uprights 6, are similarly rectangular in cross-section and are provided with inwardly extending flanges 13. Provided for removable securement to the flanges 11, 12, 13, on each of the side frames 2, 3, are removable side plates 14, 15, which are provided along their peripheral margins with brackets 16, 17, for securement to the flanges 11, 12, 13, through sheet metal screws 18. The brackets 16, 17, are preferably S-shaped in the manner as shown in FIG. 3, so that the sheet metal screws 18 are recessed and the exterior faces of the side plates 14, 15, are, in effect, coplanar with the exterior faces of the side frames 2, 3.

Extending between and secured to the flanges 13 on each of the forward uprights 6 is a front cover panel 19 which extends through approximately half of the vertical length of the housing 1. The remainder of the area between the front upright 6 is covered by a grill 20 which is also secured to the flanges 13 on each of the forward uprights 6. Similarly secured to the flanges 13 on the rear upright 6 is a rear panel 21 and a rear grill 22, the latter covering the lower half of the area between the rear uprights 6.

Each of the lower support rails 5 is provided with inwardly struck flanges 23 for supporting a base plate 14 which is secured by sheet metal screws 25. The base plate 24 is slightly shorter than the overall length of the housing 1 in order to provide relief for a caster supporting bracket 26 and rigidly mounted on the underside of the bracket 26 is a swivel caster 27. At the opposite end of the housing 1 is a rigid support shaft 28 which is rigidly secured to the underside of each of the longitudinal support rails 5, and secured to the outer ends of the shaft 28 are rubber rimmed wheels 29.

The front cover panel 19 forms the front wall of a relatively large storage compartment 30 which is further defined by a back wall 31, a bottom wall 32, and side walls 33, the latter being spot-welded to the flanges 11 on the support rail 4. Moreover, the side walls 33 are also welded to the flanges 12 on the forward upright 6. The storage compartment 30 is sized to contain three polyethylene coolant storage bottles 34, substantially as shown in FIG. 3. The front cover panel 19 is slightly recessed in order to accommodate a pivotally mounted lid 35 which is pivotally mounted on the forward margins of the side walls 33 in the manner as shown in FIG. 4. The lid 35 is provided with a downwardly struck flange 36 which covers the area in the recess in the front cover panel 19. Thus, when the lid 35 is pivoted to its open position it is supported by the upper margin of the cover panel 19. Moreover, the lid 35 is provided with an aperture 36' so that the lid 35 may be grasped for pivotal movements.

A control housing 37, preferably formed of aluminum or other light weight metal and including a top wall 38 which integrally merges into a pair of depending side walls 39, is provided for rigid securement to the upper end of the housing 1. The side walls 39 are spot-welded to the interior surfaces of the downward struck flanges 11 formed on the upper horizontal support bars 4. By reference to FIGS. 1 and 2, it can be seen that the control housing 37 covers the remainder of the open area of the housing 1. The control housing 37 is internally subdivided by a vertical partition 40, thereby forming an instrument-containing compartment 41 and a storage compartment 42, the latter being provided with a swingably mounted door 43. Along the forward margin, the control housing 37 is provided with a chrome strip 44 which has an oblique front face 45, and includes an inwardly extending annular flange 46 along the front face. Screwed or otherwise rigidly secured to the interior faces of the side walls 39 and to the upper support bars 4 are L-shaped brackets 47 for retaining an intrument support plate 48 by means of machine screws 49. The plate 48 is slightly recessed from the front face of the control housing 37 and is coplanar therewith for supporting an instrument panel 50. The instrument panel 50 fits flush against the interior annular flange 46 and is retained by an external flange 51. The instrument panel 50 is preferably formed of a relatively rigid opaque synthetic resin material which is provided with a pair of semi-circular transparent viewing areas 52, for reasons which will presently more fully appear.

The device A includes a cooling system 53 which comprises a conventional motor driven compressor 54, a condenser 55, and a cooling coil 56 of the capillary tube type. The cooling system 53 is provided with a temperature regulator which includes a thermostat 57 connected in series with a bypass valve 58 for bypassing the evaporator (not shown). Thus, it is possible to maintain accurate temperature control on the cooling system 53. If the evaporator should continue to run gassy or "liquid starved," due to an excess load, the condenser will produce more liquid refrigerant in order to meet the extra cooling load. Under such conditions, the bypass valve 58 remains closed. If, however, the evaporator should begin to run "cold," that is to say, that too much liquid refrigerant is being produced, the thermostrat 57 will close, thereby opening the bypass valve 58, permitting the liquid refrigerant to bypass the evaporator. Thus, constant temperature control is always maintained on the cooling system by setting the thermostat 57 to a desired temperature condition. The cooling system 53 is actuated by a refrigeration switch 59 which is mounted in a cover plate or switch panel 60. The switch panel 60 is secured to a switch housing 61 by means of set screws 62, the housing 61 being bolted to the interior surface of the walls 33, and being located within the storage compartment 30.

Referring now to FIG. 5, it can be seen that the thermostat 57 is mounted on the support plate 48 and is located within the control housing 37. The thermostat 57 is conventional in its construction and operation, and, therefore, will not be described in detail herein. However, for purposes of describing the present invention, it will suffice to point out that the thermostat 57 includes an indicator plate 63 having printed thereon a temperature scale reading —40° F. to +40° F., and also a temperature setting needle $n$ and a temperature reading needle $n'$. The thermostat 57 is secured to the plate 48 in such manner that the indicator plate 63 appears through one of the transparent areas 52 in the instrument panel 50. Morever, the thermostat 57 is conventionally provided with a stem 57' for accommodating an adjusting knob 64 in which manner the temperature at which the cooling system operates can be regulated.

The evaporator is mounted within a heat-exchanger 65, which is, in turn, rigidly mounted on a support plate 66, the latter being secured to a plurality of vertical legs 67, which are, in turn, welded to the base plate 24. The cooling fluid, which is pumped into the patient's gastrointestinal tract, is cycled through the heat-exchanger 65 so that the cooling fluid is always maintained in a pure or sterile condition and never comes in contact with the cooling system 53 except through the heat-exchanger 65. Welded or otherwise rigidly secured to the interior face of the rear cover plate 21 is a horizontal support plate 68 and mounted on the upper surface thereof is a pump 69 which is connected to the cooling system in a manner to be hereinafter described.

Also mounted within the housing is a relay box 70 and a terminal box 71, the former containing a series of relays to be hereinafter described, and the terminal box 71 containing a connector strip (not shown) for electrical connections. A pump switch 72 is electrically connected across the pump 69 for controlling the operation thereof and is mounted within the switch plate 60.

The temperature of the cooling fluid which is returned from the patient and is recycled back to the heat-exchanger 65 is indicated by a return thermometer 73 which is similarly mounted on the support plate 48 by means of screws (not shown). The thermometer 73 is conventional in construction and operation and is, therefore, not described in detail herein. However, it is sufficient to point out for purposes of illustrating the present invention that the thermometer 73 includes a dial face 75 having printed thereon a scale ranging from —40° to +40° F. The thermometer 75 includes an indicating needle 76. Adhesively secured to the control panel 50 is a dummy control knob 77 which matches the control knob 64. In this connection, it should be noted that the thermometer 73 is mounted on the plate 48 in such manner that the dial face 75 appears through the transparent area 52 in the instrument panel 50. It should also be noted that the thermostat 57 is operatively connected to a thermostat sensing chamber 79 which is secured to a bracket 80, the latter being secured to the underside of the top wall 38 forming part of the control housing 37.

Rigidly mounted on the upper surface of the control housing 37 is a cooling fluid reservoir 81 which consists of a brass tube housing 82. The housing 82 is provided with a brass base collar 83, the latter being provided with studs 84 for rigid securement to the top wall 39 of the control housing 37. Concentrically disposed within the tube housing 82 is a glass reservoir bottle 85 which fits within an annular groove 86 formed within the brass collar 83 and is sealed by an annular sealing ring 87. The tube housing 82 is preferably cut away along its front face to form a window 88 through which an area of the reservoir is exposed to view and such area is preferably imprinted with accurate volumetric scale-markings. Mounted on the upper surface of the collar 83 is a flow indicator 89 which consists of a tube 90 integrally formed with the base collar 83 and is provided with a sight glass 91. The tube 90 is also provided with a cap 92 at its upper end. Mounted within the tube 90 is a piston 93 having an upstanding piston rod 94, the latter preferably having a bright Teflon spira strip painted thereon. Thus, it can be seen that the flow indicator 89 is easily visible through the sight glass 88 and that the piston rod 94 contrasts with the color of the cooling fluid so that it is easily determined when fluid flow is taking place through the reservoir 81. Also mounted on the base collar 83 is a reservoir light 95 and is suitably connected to a source of electrical current to be hereinafter described in detail.

Welded or otherwise rigidly secured to the base collar 83 and extending concentrically through the reservoir bottle 85 is an upstanding hollow post 96, and mounted on the upper end thereof is a swivel cap 97. Also mounted on the upper end of the reservoir bottle 85 is a brass closure plate 98 which is provided with an annular groove 99 for engaging the upper margin of the bottle 85. The cap 97 is provided with a diametrally reduced portion 100 which fits within the upper end of the tube housing 82 and is provided with an annular groove 101. The tube housing 82 is provided with a retaining screw 102 which rides within the groove 101, thereby maintaining the swivel cap 97 on the tube housing 82. The swivel cap 97 is provided with a radially extending finger 103 in horizontal alignment with the retaining screw 102 so that the swivel cap 97, in effect, can only rotate through an arc which is slightly less than one complete 360° revolution. Also mounted on the interior face of the cap 97 is a conventional spring loaded hemispherical detent ball housing 104 having a hemispherical ball 105 which engages any of a plurality of hemispherical detents 106 formed in the upper surface of the closure plate 98. The detents 106 are preferably located at 20° intervals spaced around the periphery of the plate 98.

The swivel cap 97 is longitudinally grooved to accommodate a boom 107 which is provided with a telescoping tube 108 and is provided at one end with a closure cap 109, and mounted on the outer end of the tube 108 is a fluid coupling 110. The extensibility of the telescoping tube 108 is regulated through a telescope locking screw 111, the latter being threadedly mounted on the underside of the boom 107. Disposed within and carried by the hollow post 96 is a pair of flexible coolant tubes 112, 113, which are threaded about a pulley 114, the latter being rotatably mounted within the upper end of the swivel cap 97. The pulley 114 is preferably provided with a double groove for accommodating each of the tubes 112, 113, and the tubes 112, 113, are retained within the groove by means of a retaining roller 115 which is also rotatably mounted within the swivel cap 97. The tubes 112, 113, are connected to the coupling 110 in a manner to be hereinafter decribed.

At their lower ends, the tubes 112, 113, are connected to a manifold 116 which is shiftably mounted within the lower end of the hollow post 96, and is removable in a pair of opposed elongated grooves 117. The tubes 112, 113, are connected through fluid ducts 118, 119, formed within the manifold 116 to fluid lines 120, 121, respectively, which are, in turn ultimately connected to a "to patient" control valve 22 and a "from patient" control valve 123, both of which are mounted within a valve block 124, the latter being internally mounted within the housing 1. Secured to the lower end of the manifold 116 is a rod 125 which extends through a cap 126 mounted on the lower end of the post 96 and is secured at its lower end to a bearing plate 127. Concentrically mounted upon the rod 125 and being interposed between the plate 127 and the cap 126 is a comprssion spring 128 which coninually urges the manifold 116 downwardly. Through this construction, it can be seen that the flexible tubes 112, 113, are always maintained under a slight degree of tension, and as the telescoping tube 108 is shifted to its retracted position as shown in FIGS. 1 and 2, the slack within the tubes 112, 113, is immediately taken up through the manifold 116.

The reservoir 81 is hydraulically connected to a "to reservoir" valve 129 and a "from reservoir" valve 130. Also mounted within the valve block 124 is a "to storage bottle" valve 131 and a "from storage bottle" valve 132, all of which are hydraulically connected as schematically shown in the hydraulic circuitry (FIG. 14). The "to storage bottle" valve 131 and the "from storage bottle" valve 132 are hydraulically connected to a "fill and drain" hose 133 which is mounted on a tubular support rod 134 which is, in turn, secured to the front cover panel 19 forming part of the storage compartment 30. The hose 133 is conveniently disposed within the storage compartment 30 and is provided by its outer end with a filter $f$. Thus, through the operation of the various valves 122, 123, 129, 130, 131, 132, it is possible to precool the coolant in the reservoir by cycling the same through the cooling system 53 and the heat exchanger 65. By operating the valves 131, 132, it is possible to draw coolant from any of the storage bottles 34, and store the same in the reservoir 81 or to drain the reservoir 81 and store the fluid in the storage bottle 34. It is possible through the operation of the valves 122, 123, to supply the coolant to the patient in a manner more fully described in detail hereinbelow.

Inasmuch as hydraulic fluid systems and the pumping means therefor are not one hundred percent efficient, there is always the possibility that air might be sucked into the closed fluid system. Therefore, an air monitoring control system 135 is provided for indicating and purging the air which enters the system. The air monitoring system 135 includes a liquid housing 136 which maintains a certain level of the liquid coolant, and is provided with an air header space 137 for collecting any entrapped air in the system. The liquid housing 136 is provided with a float 138 which actuates a float switch 139 and the air header 137 is pneumatically connected to an air-vent valve 140 which is mounted within the valve block 124, as schematically shown in FIG. 14. It should be noted that the air-vent valve 140 is connected through a tube 140' to the base of the reservoir 81 and vents any air from the liquid housing 136 through the coolant in the reservoir 81 so that the amount of air is visually indicated. Thus, the gastro-enterologist who is conducting the operation is immediately apprised of the amount of air which has been vented from the system. Moreover, an air cycle counter 141 is mounted on the plate 48 and is visible through a transparent area 112 in the control panel 50. The air cycle counter 141 is actuated each time the air-vent valve 140 opens and is also provided with a resetting dial 142 which projects through an aperture 143 formed within the control panel 50.

Mounted in the switch plate 60 and being electrically connected to the cooling system 53 in the manner as shown schematically in FIG. 15, is a three-position precool switch 144 which includes an "off" position, a "precooling" position, and a "normal" position. The switch 144 is normally biased to its "off" position. Also mounted within the switch plate 60 and being electrically connected in the manner as shown in FIG. 15, is a reservoir switch 145 for actuating valves 129 and 130 for filling and draining the reservoir 81. Finally, mounted on the plate 48 by means of set screws (not shown) is a three-position operation switch 146 having a "run" position, a "drain" position, and a "fill" position. The operation switch is provided with a switch shaft (not shown) which extends through the control panel 50 and is provided with a control dial 147.

Mounted within the relay box 70 is a relay 148 which includes a solenoid 149, a switch 150 having normally closed contacts 151 and normally open contacts 152, and a switch 153 having normally closed contacts 154 and normally open contacts 155.

Also mounted in the relay box 70 is a relay 156 having a solenoid 157, a switch 158 having normally closed contacts 159 and normally open contacts 160, and a switch 161 having normally closed contacts 162 and normally open contacts 163. Also mounted in the relay box 70 is a relay 164 having a solenoid 165, a switch 166 having normally closed contacts 167 and normally open contacts 168, and a switch 169 having normally closed contacts 170 and normally open contacts 171. Similarly mounted in the relay box 70 is a relay 172 having a solenoid 173 and a switch 174 having normally open contacts 175. The four relays, namely, relays 148, 156, 164, and 172, are all electrically connected as schematically shown in FIG. 15.

Provided for attachment to the coupling 110 on the outer end of the telescoping tube 108 is a cooling balloon assembly 176 substantially as shown in FIG. 11. The assembly 176 includes a single-lumened sausage-shaped latex stomach flexible sac or so-called "balloon" 177 which is sized so that it will readily accommodate 1000 cc. of fluid. The balloon 177 is preferably radio-opaque so that it can be viewed, when in the patient's gastric intestinal tract, through a fluoroscope or other fluoroscopic method. The balloon 177 is disposable and is preferably contained in a sanitary wrapping (not shown). Moreover, it is possible to provide balloons of various shapes to perform different gastro hypothermia operations. For example, it is possible to provide an esophageal balloon 178 substantially as shown in FIG. 13, or a gastric balloon 179, substantially as shown in FIG. 12. The gastric balloon 179 is preferably provided for use in hemorrhaging from the stomach or duodenum. The gastric balloon 179 is preferably elongated and sausage-shaped in appearance. The esophageal balloon 178 is considerably longer than the gastric balloon 179 and is formed of a heavier gauged latex material. The esophageal balloon 178 is particularly useful where esophageal bleeding is suspected or in other conditions where hypothermia in the esophagus is desired.

Each of the balloons 177, 178, 179, is sized for attachment to a tube set 180 preferably by means of a silk thread tie 181. The tube set 180 consists of an outer hose 182 and an inner hose 183, the latter being concentrically disposed within the outer hose 182. The tube set 180 terminates in a diffuser 184, interiorly of the balloon 177. A relatively thin but rigid brass sleeve 184' is interposed between the outer and inner hoses 182, 183, respectively, in the area of attachment to the balloon 177 so that the tie 181 is secured around the sleeve 184'. In this manner, the balloon is securely attached to the tube set 180 and the tie 181 will not collapse the outer or inner hoses 182, 183, respectively. At its other end, the tube set 180 is connected to a manifold block 185 which is provided with complementary couplings, for attachment to the couplings 110 on the outer end of the telescoping tube 108. The manifold block 185 consists of a tubular casing 186 which is threadedly secured to a stem 187, the latter being connected to the outer hose 182. The inner hose 183 is provided with a fitting 188 at its outer end. A fitting 189 opens into the chamber of the casing 186 and, in effect, communicates with the outer hose 182. The fittings 188, 189, are threaded for attachment to complementary fittings 190, 191, on the coupling 110.

In use, the device A is connected to a suitable source of electrical current (not shown). The patient having the gastro hypothermia therapy performed is placed in the semi-Fowler's position by raising the level of the patient's head. The nasopharynx is topically anesthetized with an adequate amount of a suitable anesthetic. If desirable, the patient can be given an adequate amount of sedation in order to reduce any apprehension. This, however, is not often necessary inasmuch as the treatment is completely painless and involves very little, if any, discomfort. A nasogastric tube is inserted into the stomach of the patient so that the stomach may be lavaged of all blood, clots, or any other material which may be present in the stomach. For purposes of describing the present invention, the description will relate to gastric hypothermia induced in the stomach of the patient. However, it should be understood that this type of therapy could be induced anywhere in the gastro intestinal tract. It is important to remove any particular material that remains within the stomach inasmuch as this material tends to act as an insulator breaking the interfacial contact between the balloon and the stomach wall. It is often desirable to leave the nasogastric tube in place within the stomach to monitor any further bleeding. Moreover, if for some reason the gastric balloon would burst during therapy, the coolant would be quickly withdrawn from the stomach through the nasogastric tube.

Oftentimes, the gastroenterologist will determine the size of the patient's stomach through a fluoroscope prior to the use of this method of therapy. Thus, this enables the gastroenterologist to determine how much fluid should be admitted to the balloon.

Next, the balloon 177 is connected to the tube set 180, and the manifold 185 is connected to the coupling 110 on the telescoping tube 108. Since the balloon 177 is very pliable, it is wadded up into a small package so that the balloon 177 may be inserted through the nose of the patient and into the stomach. In this connection, it should be noted that the esophageal balloon 178 is employed if it is desired to perform the gastric hypothermia therapy in the esophagus, and the gastric balloon 179 is employed if it is desired to perform the gastric hypothermia therapy in the duodenum. It is sometimes desirable to lubricate the balloon 177 and tube assembly 180 with a suitable jelly prior to insertion into the stomach.

The refrigeration switch 59 is moved to the "on" position, and the pump switch 72 is moved to the "on" position. The closing of the pump switch 72 not only operates the pump 62 but energizes the reservoir light 115 as well. It should also be noted, by reference to FIG. 15, that the closing of the pump switch 72 also energizes the precooling switch 144, the operation switch 146, and the reservoir switch 145. During the time that the patient is being prepared for the gastric hypothermia therapy, the gastro-enterologist will insert the tube 133 into one of the storage bottles 34 for filling the reservoir 81. The reservoir switch 145 is shifted to the "fill" position, thereby completing a circuit to the solenoid valve 132. It should be noted that the closing of the reservoir switch 145 to the "fill" position energizes the solenoid 149, thereby closing the switch 153, opening the normally closed contacts 154, and closing the normally open contacts 155. This will prevent a completion of the circuit to the solenoid valve 131. If the solenoid valve 131 is open, fluid will flow from the storage bottle 34. The closing of the switch 131 also completes a circuit to the solenoid 157, thereby closing normally open contacts 163 and the switch 161. A circuit is also completed to the solenoid 165, thereby closing the normally open contacts 171, of the switch 169, and closing the normally open contacts 168 of the switch 166. This will, in turn, complete a circuit to solenoid valves 129, 130. As this happens, the coolant which is pumped from the storage bottle 34 is pumped through valve 132, through valve 129, and into the reservoir 81. After a desired quantity has been pumped into the reservoir 81, the reservoir switch 145 is released so that it shifts to its normally "off" position. In this connection, it should be noted that a completing of the circuit to the relay 156 will energize the pump 69 even if the pump switch 72 is in the "open" position.

Also during the preparation of the patient, the gastro enterologist will precool the coolant in the reservoir 81, which is ultimately to be pumped to the balloon 177. The gastro enterologist will next close the precooling switch 144 to the "precool" position. The closing of the precool switch 144 to the "precool" position completes a circuit to the relay 164, energizing the solenoid 165, and closing the normally open contacts 168 of the switch 166. Moreover, a circuit is completed to the relay 148, energizing the solenoid 149, and closing the normally open contacts 152 of the switch 150. This will, in turn, energize the solenoid valve 129, 130, completing a circuit from the reservoir 81 to the heat-exchanger 65. It is to be noted that the gastro enterologist can determine the desired precooled temperature by maintaining a setting on the thermostat 57 through the dials 64. The temperature of the coolant returning from the heat-exchanger 65 will be recorded on the thermostat 57 and the temperature of the coolant being cycled to the heat-exchanger 65 will appear on the thermometer 73. After a desired coolant temperature has been attained, the precooling switch 144 is shifted to the "off" position.

Referring now to FIG. 15, it can be seen that the thermostat 57 is so located that it bypasses the circuit to the evaporator in the heat-exchanger 65 through the bypass valve 58. Thus, if the heat-exchanger 65 begins to run "cold" so that too much liquid refrigerant is being produced, the thermostat 57 will close, opening the bypass valve 58, and permitting liquid refrigerant to bypass the evaporator within the heat-exchanger 65. If the evaporator begins to run "warm," it will become "liquid-starved" and the bypass valve 58 will close, permitting more liquid refrigerant delivery to the evaporator.

After the patient has been prepared for the therapy, the gastro-enterologist shifts the operation switch 146 to the "fill" position. It is desirable to introduce the cooling fluid into the balloon 177 from the reservoir 81 in 100 cc. increments until the required circulating volume has been attained. The reservoir sight glass 88 is graduated in 100 cc. increments so that a reduction in the fluid level of 100 cc. in the reservoir 81 can be conveniently noted. The gastro-enterologist also shifts the precool switch 144 to the "normal" position, thereby completing a circuit to the operation switch 146. When the operation switch 146 has been shifted to the "fill" position, a circuit is completed to the relay 148, energizing the solenoid 149, and closing the normally open contacts 152 of the switch 150. This, in turn, completes a circuit to the "from reservoir" solenoid valve 130. Moreover, it can be noted by reference to FIG. 15 that the normally closed contacts 167 of the switch 166 remain closed. Inasmuch as the relay 156 remains unenergized, the normally closed contacts 162 of the switch 161 remain closed and a circuit is completed to the "to patient" solenoid valve 122. By reference to FIG. 14, it can be seen that coolant will flow from the reservoir 81 and to the balloon 177. The gastro-enterologist will withdraw coolant from the resrvoir and pump the same to the balloon 177 until the desired volume in the balloon has been achieved. This desired volume, of course, is determined by the level difference which appears in the window 88. As an alternative method, the gastro-enterologist can use the fluoroscopy method of determining the volume of coolant which is supplied to the balloon 177. In this method, the gastro-enterologist employs a fluoroscope and causes the patient to swallow a suitable material used in fluoroscopics, such as barium sulphate. The barium sulphate will line the stomach of the patient and the outline of the stomach will appear on the screen on the fluoroscope. Inasmuch as the balloon 177 is radio-opaque, the latter will also appear on the screen of the fluoroscope. The gastro-enterologist will pump coolant to the balloon 177 where it will be expanded by the coolant and substantially fill the space of the patient's stomach. When the balloon 177 has expanded to a point where it substantially fills the stomach of the patient, the gastro-enterologist can then cease the flow of further coolant.

After the balloon 177 has been filled to a desired volume, the gastro-enterologist shifts the operation switch 146 to the "run" position. In this position, it should be noted that since the pump switch 72 is closed, a circuit will be completed to the "to patient" solenoid valve 122 and the "from patient" solenoid valve 123. Thus, coolant will be continually cycled through the heat-exchanger 65 and back to the balloon 177 completely bypassing the reservoir 81. As described above, the temperature is regulated through the thermostat 57 and the returned temperature of the coolant from the patient's stomach is indicated by the thermometer 73.

It can thus be seen that while the patient is undergoing therapy, the coolant is traveling in a closed system. If an air leak should occur air would be sucked into the closed system and thereby eventually expand the volume of the balloon 177, if the air monitoring system 135 were not provided. The air which is thereby drawn into the system is collected in the air header 137 of the liquid housing 136. The float 138 senses the amount of coolant which is present in the liquid housing 136. When a sufficient amount of air is collected in the air header 137, this pressure will cause the liquid volume in the housing 136 to decrease. The float 138 will then close the float switch 139 which completes a circuit to the air-vent valve 140, thereby opening this valve and permitting a discharge of the air from the air header 137. By reference to FIG. 18, it can be seen that the air which is discharged from the air header 137 will pass through the reservoir 81 and will thus give the gastro-enterologist visual indication that an air leak is present somewhere in the system. If the quantity of air which bubbles through the reservoir 81 is consistently large, the gastro-enterologist will be apprised of the fact that a rather serious air leak has occurred and the entire therapy may have to be ceased until the leak can be located. This, however, would be a rather rare case and, for the most part, any air leak would be small and the quantity of air drawn in the system would be adequately discharged through the air monitoring system 135.

The air cycle counter 141 will determine the number of times that the air vent valve 140 has opened and this gives the gastro-enterologist recorded indication of the number of times that air has been purged from the system. This is particularly effective in cases where the gastro-enterologist cannot continually view the sight glass 88.

After the gastric hypothermia therapy has been completed, the gastro-enterologist shifts the operation switch 146 to the "drain" position, where a circuit is completed to the relay 164, closing normally open contacts 168 and switch 166. This will complete a circuit to the solenoid valve 129, thereby opening the same. Moreover, a circuit is also completed to the solenoid valve 123 opening this valve, and thereby causing the coolant to drain from the balloon 177 into the reservoir 81. When the level of coolant in the reservoir 81 ceases to rise, the gastro-enterologist is apprised of the fact that the balloon 177 is empty, and the open switch 146 is shifted to the "run" position. At this point, the balloon 177 is again shriveled up and can be easily withdrawn from the patient's stomach. Moreover, the nasogastric tube is also removed from the patient's stomach. If it is desired to drain the reservoir 81, the gastro-enterologist switches the reservoir switch 145 to the "drain" position, thereby completing a circuit to the solenoid valve 131, opening the same. Moreover, a circuit is also completed to the relay 148, thereby closing normally open contacts 152, of the switch 150 and completing a circuit to the solenoid valve 130. Additionally, a circuit is completed to the relay 156 closing normally open contacts 160 of the switch 158. This latter relay, namely relay 156, serves to energize the pump 69 in the event that the pumping switch 72 is in the "off" position. As the valves 130, 131, are open, coolant is permitted to drain from the reservoir 81 and into the storage bottle 34.

It has been established that by cooling the stomach wall, or any other portion of the gastrointestinal wall for that matter, to a temperature which is substantially less than normal temperature, a very significant reduction in gastric blood flow is achieved. Through the device A, it is possible to attain intragastric cooling, where the gastrointestinal wall is lowered to a range of 10° C. to 14° C. Intragastric cooling is most desirable for supportive therapy in treatment of gastrointestinal hemorrhages. Moreover, it is particularly effective in the treatment of peptic ulceration, esophageal varices, and other disorders such as malignant neoplasms, and gastric carcinomas. The treatment is usually administered to a patient for a period of 24 to 48 hours or longer, as the condition may indicate.

It is possible to attain intragastric freezing through the device A merely by resetting the temperature on the thermostat 57. Intragastric freezing is particularly effective for the control of peptic ulcer diathesis, and where it is desirable to completely suppress the functions of the parietal cells in the gastric mucosa. The stomach temperature is usually lowered to −7° C. to −10° C. and the treatment is usually administered for a period of 45 to 60 minutes. This time limit and temperature limit is critical in that if the freezing were extended beyond this period, gastric-wall necrosis might occur.

During the treatment, it is desirable to provide external warming of the patient in order to maintain normal body temperature, since gastric cooling will normally produce body hypothermia if not counteracted. It has been found that blanket temperature of 100° F. to 110° F. will accurately maintain body temperature without damaging the skin. The body temperature of the patient can be conveniently checked through a thermister probe placed in the patient's rectum.

It should be understood that changes and modifications in the form, construction, arrangement, and combination of the several parts of the means and methods for producing gastric hypothermia, and in the steps of its production, may be made and substituted for those herein shown and described without departing from the nature and principle of our invention.

Having thus described our invention, what we claim and desire to secure by Letters Patent is:

1. A device for inducing hypothermia comprising a flexible sac formed of material through which heat readily flows, said sac being adapted for insertion into an organ of the human body and being capable, when inserted, of expanding into contact with surfaces of said organ, a reservoir for holding a measured quantity of a coolant liquid, refrigerating means for chilling said liquid to a temperature range substantially below body temperature, said reservoir being connected to the refrigerating means in a liquid circulating system, means for recirculating the liquid from the reservoir through the refrigerating means and back to the reservoir so as to precool the liquid means for circulating said chilled liquid through the sac while the latter is in contact with surfaces of said organ, and means for purging air and entrained gases from the cirulating liquid.

2. A device for inducing hypothermia comprising a flexible sac formed of material through which heat readily flows, said sac being adapted for insertion into an organ of the human body and being capable, when inserted, of expanding into contact with surfaces of said organ, a reservoir for holding a measured quantity of a coolant liquid, refrigerating means for chilling said liquid to a temperature range substantially below body temperature, said reservoir being connected to the refrigerating means in a liquid circulating system, means for recirculating the liquid from the reservoir through the refrigerating means and back to the reservoir so as to precool the liquid means for cirulating said chilled liquid through the sac while the latter is in contact with surfaces of said organ, means for purging air and entrained gases from the circulating liquid, and visually observable indicator means associated with the air purging means.

3. A device for inducing hypothermia comprising a flexible sac formed of material through which heat readily flows, said sac being adapted for insertion into an organ of the human body and being capable, when inserted, of expanding into contact with surfaces of said organ, a reservoir for holding a measured quantity of a coolant liquid, refrigerating means for chilling said liquid to a temperature range substantially below body temperature, said reservoir being connected to the refrigerating means in a liquid circulating system, means for recirculating the liquid from the reservoir through the refrigerating means and back to the reservoir so as to precool the liquid means for circulating said chilled liquid through the sac while the latter is in contact with surfaces of said organ, means for purging air and entrained gases from the circulating liquid, and valve means operatively associated with the air purging means and having a vent opening through the body of liquid in the reservoir so that the air and entrained gases being purged from the system will bubble through the body of liquid in the reservoir, thereby affording a visual indication of the amount of air and entrained gases being purged from the system.

4. A device for inducing hypothermia comprising a flexible sac formed of material through which heat readily flows, said sac being adapted for insertion into an organ of the human body and being capable, when inserted, of expanding into contact with surfaces of said organ, a reservoir for holding a measured quantity of a coolant liquid, refrigerating means for chilling said liquid to a temperature range substantially below body temperature, said reservoir being connected to the refrigerating means in a liquid circulating system, means for recirculating the liquid from the reservoir through the refrigerating means and back to the reservoir so as to precool the liquid, means for circulating said chilled liquid through the sac while the latter is in contact with surfaces of said organ, an auxiliary reservoir forming a part of the liquid circulating system, said reservoir being adapted to maintain a level of liquid under pressure beneath a body of gas under pressure so that as the liquid flows through said auxiliary reservoir any air or other entrained gases which may have unauthorizedly leaked into the system will bubble out of the liquid and in said body of gas, a valve operatively associated with said auxiliary reservoir for venting gas therefrom, and means operatively associated with said auxiliary reservoir for intermittently causing said valve to open and release gas from the reservoir.

5. A device for inducing hypothermia comprising a flexible sac formed of material through which heat readily flows, said sac being adapted for insertion into an organ of the human body and being capable, when inserted, of expanding into contact with surfaces of said organ, a reservoir for holding a measured quantity of a coolant liquid, refrigerating means for chilling said liquid to a temperature range substantially below body temperature, said reservoir being connected to the refrigerating means in a liquid circulating system, means for recirculating the liquid from the reservoir through the refrigerating means and back to the reservoir so as to precool the liquid means for circulating said chilled liquid through the sac while the latter is in contact with surfaces of said. organ, means for purging air and entrained gases from the circulating liquid, an auxiliary reservoir forming a part of the liquid cirulating system, said reservoir being adapted to maintain a level of liquid under pressure beneath a body of gas under pressure so that as the liquid flows through said auxiliary reservoir any air or other entrained gases which may have unauthorizedly leaked into the system will bubble out of the liquid and in said body of gas, a valve operatively associated with said auxiliary reservoir for venting gas therefrom, and liquid level responsive means operatively associated with said auxiliary reservoir for intermittently causing said valve to open and release gas from the reservoir.

6. A device for inducing hypothermia comprising a flexible sac formed of material through which heat readily flows, said sac being adapted for insertion into an organ of the human body and being capable, when inserted, of expanding into contact with surfaces of said organ, a reservoir for holding a measured quantity of a coolant liquid, refrigerating means for chilling said liquid to a temperature range substantially below body temperature, said reservoir being connected to the refrigerating means in a liquid circulating system, means for recirculating the liquid from the reservoir through the refrigerating means and back to the reservoir so as to precool the liquid means for cirulating said chilled liquid through the sac while the latter is in contact with surfaces of said organ, means for purging air and entrained gases from the circulating liquid, an auxiliary reservoir forming a part of the liquid circulating system, said reservoir being adapted to maintain a level of liquid under pressure beneath a body of gas under pressure so that as the liquid flows through said auxiliary reservoir any air or other entrained gases which may have unauthorizedly leaked into the system will bubble out of the liquid and in said body of gas, a valve operatively associated with said auxiliary reservoir for venting gas therefrom, and float controlling means operatively associated with said auxiliary reservoir for intermittently causing said valve to open and release gas from the reservoir.

7. A device for inducing hypothermia, said device comprising an expandable sac which is provided for insertion into an organ of the human body and is adapted to expand to fill the counter of said organ, a cooling system for refrigerating a cooling liquid to a temperature substantially below body temperature, a cooling liquid reservoir operatively associated with said cooling means for collecting the refrigerated liquid, conduit means connecting said reservoir to said sac, pumping means for pumping the cooling liquid from the reservoir to the cooling means and to the sac where it will cause the sac to expand until it substantially fills the space of the organ, first valve means operatively connected to the pumping means and cooling means for optionally filling said reservoir to a pre-selected level from a source of fluid, second valve means operatively connected to the pumping means and cooling means for draining said reservoir, and third valve means operatively connected to said pumping means and cooling means for optionally bypassing said sac and recycling the cooling fluid from the reservoir to the cooling means for refrigerating the cooling fluid to a selected temperature.

8. A device for inducing hypothermia, said device comprising an expandable sac which is provided for insertion into an organ of the human body and is adapted to expand to fill the contour of said organ, a cooling system for refrigerating a cooling liquid to a temperature substantially below body temperature, a cooling liquid reservoir operatively associated with said cooling means for collecting the refrigerated liquid, conduit means connecting said reservoir to said sac, pumping means for pumping the cooling liquid from the reservoir to the cooling means and to the sac where it will cause the sac to expand until it substantially fills the space of the organ, first valve means operatively connected to the pumping means and cooling means for optionally filling said reservoir to a pre-selected level from a source of fluid, second valve means operatively connected to the pumping means and cooling means for draining said reservoir, third valve means operatively connected to said pumping means and cooling means for optionally bypassing said sac and recycling the cooling fluid from the reservoir to the cooling means for refrigerating the cooling fluid to a selected temperature, and fourth valve means operatively connected to the pumping means and cooling means for optionally bypassing said reservoir and recycling the cooling fluid from the sac to the cooling means.

9. A device for inducing hypothermia, said device comprising an expandable sac which is provided for insertion into an organ of the human body and is adapted to expand to fill the contour of said organ, a cooling system for refrigerating a cooling liquid to a temperature substantially below body temperature, a cooling liquid reservoir operatively associated with said cooling means for collecting the refrigerated liquid, conduit means connecting said reservoir to said sac, pumping means for pumping the cooling liquid from the reservoir to the cooling means and to the sac where it will cause the sac to expand until it substantially fills the space of the organ, and monitoring means indicating any entrapped air which may have entered the cooling system.

10. A device for inducing hypothermia, said device comprising an expandable sac which is provided for insertion into an organ of the human body and is adapted to expand to fill the contour of said organ, a cooling system for refrigerating a cooling liquid to a temperature substantially below said body temperature, a cooling liquid reservoir operatively associated with said cooling means for collecting the refrigerated liquid, conduit means connecting said reservoir to said sac, pumping means for pumping the cooling liquid from the reservoir to the cooling means and to the sac where it will cause the sac to expand until it substantially fills the space of the organ, monitoring means indicating any entrapped air which may have entered the cooling system, and valve means operatively associated with the monitoring means for periodically purging the system of any entrapped air.

11. A device for inducing hypothermia, said device comprising an expandable sac which is provided for insertion into an organ of the human body and is adapted to expand to fill the contour of said organ, a cooling system for refrigerating a cooling liquid to a temperature substantially below body temperature, a cooling liquid reservoir operatively associated with said cooling means for collecting the refrigerated liquid, conduit means connecting said reservoir to said sac, pumping means for pumping the cooling liquid from the reservoir to the cooling means and to the sac where it will cause the sac to expand until it substantially fills the space of the organ, monitoring means indicating any entrapped air which may have entered the cooling system, and means operatively associated with said last named means for visually indicating the amount of entrapped air collected in the system.

12. The method of inducing gastric hypothermia in an individual, said method comprising inserting a sac into that portion of the gastrointestinal tract in which it is desired to induce the hypothermal condition, lavaging that portion of the gastrointestinal tract of any solid or liquid material contained therein, continuously recirculating a cooling liquid which is the range of −7° to 20° C. into said sac so that it will reduce the temperature of the walls of the surrounding gastrointestinal tract, causing said sac to expand to a point where it substantially fills the area in that portion of the gastrointestinal tract, continually lavaging said last named portion of the gastrointestinal tract for a period of from one to five hours, and removing entrained air and gas bubbles from the recirculated cooling liquid prior to re-entry into the sac.

13. A device for inducing hypothermia, said device comprising an expandable sac which is provided for insertion into an organ of the human body and is adapted to expand to fill the contour of said organ, a cooling system for refrigerating a cooling liquid to a temperature substantially below body temperature, a cooling liquid reservoir operatively associated with said cooling means for collecting the refrigerated liquid, said reservoir consisting of an upright vertical transparent-walled tank having a volume substantially greater than the quantity of liquid to be maintained therein, said tank being open at its upper end at atmospheric pressure so that the surface of liquid within the tank will be at atmospheric pressure, a liquid supply tube and a liquid return tube, both of which enter the lower portion of the reservoir substantially below the liquid level therein for connecting said reservoir to said sac, pumping means for pumping the cooling liquid from the reservoir to the cooling means and to the sac where it will cause the sac to expand until it substantially fills the space of the organ, first valve means operatively connected to the pumping means and cooling means for optionally filling said reservoir to a pre-selected level from a source of fluid, second valve means operatively connected to the pumping means and cooling means for draining said reservoir, third valve means operatively connected to said pumping means and cooling means for optionally bypassing said sac and recycling the cooling fluid from the reservoir to the cooling means for refrigerating the cooling fluid to a selected temperature, and fourth valve means operatively connected to the pumping means and cooling means for optionally bypassing said reservoir and recycling the cooling fluid from the sac to the cooling means.

References Cited by the Examiner

UNITED STATES PATENTS

| | | | |
|---|---|---|---|
| 3,007,473 | 11/1961 | Jackson | 128—400 |
| 3,064,649 | 11/1962 | Fuson | 128—214 |
| 3,125,096 | 3/1964 | Antiles et al. | 128—401 |

OTHER REFERENCES

Peter: "Technique of Gastric Freezing," vol. 181, JAMA, Sept. 1, 1962, pp. 760–764.

Wangensteen: "Achieving Physiological Gastrectoncy," vol. 180, JAMA, May 12, 1962, pp. 439–444.

Wangensteen: "Depression of Gastric Secretion," vol. 44, Surgery, August 1958, pp. 265–274.

RICHARD A. GAUDET, *Primary Examiner.*

LOUIS B. PRINCE, *Examiner.*

SIMON BRODER, *Assistant Examiner.*